United States Patent
Suciu et al.

(10) Patent No.: US 9,845,727 B2
(45) Date of Patent: Dec. 19, 2017

(54) TIP TURBINE ENGINE COMPOSITE TAILCONE

(75) Inventors: Gabriel L. Suciu, Glastonbury, CT (US); James W. Norris, Lebanon, CT (US); Brian Merry, Andover, CT (US)

(73) Assignee: United Technologies Corporation, Farmington, CT (US)

( * ) Notice: Subject to any disclaimer, the term of this patent is extended or adjusted under 35 U.S.C. 154(b) by 2809 days.

(21) Appl. No.: 11/720,463

(22) PCT Filed: Dec. 1, 2004

(86) PCT No.: PCT/US2004/040176
§ 371 (c)(1),
(2), (4) Date: May 30, 2007

(87) PCT Pub. No.: WO2006/060006
PCT Pub. Date: Jun. 8, 2006

(65) Prior Publication Data
US 2008/0092514 A1    Apr. 24, 2008

(51) Int. Cl.
| *F02C 1/00* | (2006.01) |
| *F02C 3/073* | (2006.01) |
| *F02K 1/04* | (2006.01) |
| *F02K 3/068* | (2006.01) |

(52) U.S. Cl.
CPC ............... *F02C 3/073* (2013.01); *F02K 1/04* (2013.01); *F02K 3/068* (2013.01); *F05D 2300/603* (2013.01); *F05D 2300/614* (2013.01); *Y02T 50/672* (2013.01); *Y10T 29/49346* (2015.01)

(58) Field of Classification Search
USPC ....... 60/226.1, 262, 263, 770, 771; 181/213, 181/284, 292, 293; 239/265.11
See application file for complete search history.

(56) References Cited

U.S. PATENT DOCUMENTS

| 1,544,318 | A |  | 6/1925 | Hodgkinson |  |
| 2,221,685 | A |  | 11/1940 | Smith |  |
| 2,414,410 | A |  | 1/1947 | Griffith |  |
| 2,499,831 | A |  | 3/1950 | Palmatier |  |
| 2,504,421 | A | * | 4/1950 | Hawkins, Jr. et al. | ....... 138/149 |

(Continued)

FOREIGN PATENT DOCUMENTS

| DE | 1301364 | 8/1969 |
| FR | 2274788 | 1/1976 |

(Continued)

*Primary Examiner* — Gerald L Sung
(74) *Attorney, Agent, or Firm* — Carlson, Gaskey & Olds, P.C.

(57) ABSTRACT

A non-metallic tailcone (202) in a tip turbine engine includes a tapered wall structure disposed (208) about a central axis. The non-metallic tailcone is fastened to a structural frame (44) in the aft portion of the tip turbine engine. The tip turbine engine produces a first temperature gas stream from a first output source and a second temperature gas stream from a second output source. The second temperature gas stream is a lower temperature than the first temperature gas stream. The second temperature gas stream is discharged at an inner diameter of the tip turbine engine over an outer surface of the tailcone. Discharging the cooler second temperature gas stream at the inner diameter allows a non-metallic to be used to form the tailcone.

14 Claims, 3 Drawing Sheets

(56) References Cited

U.S. PATENT DOCUMENTS

| | | | |
|---|---|---|---|
| 2,548,975 | A | 4/1951 | Hawthorne |
| 2,611,241 | A | 9/1952 | Schulz |
| 2,620,554 | A | 12/1952 | Mochel et al. |
| 2,698,711 | A | 1/1955 | Newcomb |
| 2,801,789 | A | 8/1957 | Moss |
| 2,830,754 | A | 4/1958 | Stalker |
| 2,874,926 | A | 2/1959 | Gaubatz |
| 2,989,848 | A | 6/1961 | Paiement |
| 3,009,630 | A | 11/1961 | Busquet |
| 3,037,742 | A | 6/1962 | Dent et al. |
| 3,042,349 | A | 7/1962 | Pirtle et al. |
| 3,081,597 | A | 3/1963 | Kosin et al. |
| 3,132,842 | A | 5/1964 | Tharp |
| 3,204,401 | A | 9/1965 | Serriades |
| 3,216,455 | A | 11/1965 | Cornell et al. |
| 3,267,667 | A | 8/1966 | Erwin |
| 3,269,120 | A | 8/1966 | Sabatiuk |
| 3,283,509 | A | 11/1966 | Nitsch |
| 3,286,461 | A | 11/1966 | Johnson |
| 3,302,397 | A | 2/1967 | Davidovic |
| 3,363,419 | A | 1/1968 | Wilde |
| 3,404,831 | A | 10/1968 | Campbell |
| 3,465,526 | A | 9/1969 | Emerick |
| 3,496,725 | A | 2/1970 | Ferri et al. |
| 3,505,819 | A | 4/1970 | Wilde |
| 3,616,616 | A | 11/1971 | Flatt |
| 3,684,857 | A | 8/1972 | Morley et al. |
| 3,703,081 | A | 11/1972 | Krebs et al. |
| 3,705,775 | A | 12/1972 | Rioux |
| 3,720,060 | A | 3/1973 | Davies et al. |
| 3,729,957 | A | 5/1973 | Petrie et al. |
| 3,735,593 | A | 5/1973 | Howell |
| 3,811,273 | A | 5/1974 | Martin |
| 3,818,695 | A | 6/1974 | Rylewski |
| 3,836,279 | A | 9/1974 | Lee |
| 3,861,822 | A | 1/1975 | Wanger |
| 3,932,813 | A | 1/1976 | Gallant |
| 3,979,087 | A | 9/1976 | Boris et al. |
| 4,005,575 | A | 2/1977 | Scott et al. |
| 4,130,379 | A | 12/1978 | Partington |
| 4,147,035 | A | 4/1979 | Moore et al. |
| 4,251,185 | A | 2/1981 | Karstensen |
| 4,251,987 | A | 2/1981 | Adamson |
| 4,265,646 | A | 5/1981 | Weinstein et al. |
| 4,271,674 | A | 6/1981 | Marshall et al. |
| 4,298,090 | A | 11/1981 | Chapman |
| 4,326,682 | A | 4/1982 | Nightingale |
| 4,452,038 | A | 6/1984 | Soligny |
| 4,463,553 | A | 8/1984 | Boudigues |
| 4,561,257 | A | 12/1985 | Kwan et al. |
| 4,563,875 | A | 1/1986 | Howald |
| 4,631,092 | A | 12/1986 | Ruckle et al. |
| 4,751,816 | A | 6/1988 | Perry |
| 4,785,625 | A | 11/1988 | Stryker et al. |
| 4,817,382 | A | 4/1989 | Rudolph et al. |
| 4,834,614 | A | 5/1989 | Davids et al. |
| 4,883,404 | A | 11/1989 | Sherman |
| 4,887,424 | A | 12/1989 | Geidel et al. |
| 4,904,160 | A | 2/1990 | Partington |
| 4,912,927 | A | 4/1990 | Billington |
| 4,965,994 | A | 10/1990 | Ciokajlo et al. |
| 4,999,994 | A | 3/1991 | Rud et al. |
| 5,010,729 | A | 4/1991 | Adamson et al. |
| 5,012,640 | A | 5/1991 | Mirville |
| 5,014,508 | A | 5/1991 | Lifka |
| 5,054,635 | A * | 10/1991 | Kolom ................. 220/4.15 |
| 5,088,742 | A | 2/1992 | Catlow |
| 5,107,676 | A | 4/1992 | Hadaway et al. |
| 5,157,915 | A | 10/1992 | Bart |
| 5,182,906 | A | 2/1993 | Gilchrist et al. |
| 5,224,339 | A | 7/1993 | Hayes |
| 5,232,333 | A | 8/1993 | Girault |
| 5,267,397 | A | 12/1993 | Wilcox |
| 5,269,139 | A | 12/1993 | Klees |
| 5,275,536 | A | 1/1994 | Stephens et al. |
| 5,315,821 | A | 5/1994 | Dunbar et al. |
| 5,328,324 | A | 7/1994 | Dodd |
| 5,331,816 | A * | 7/1994 | Able et al. ................. 60/753 |
| 5,443,590 | A | 8/1995 | Ciokajlo et al. |
| 5,466,198 | A | 11/1995 | McKibbin et al. |
| 5,495,979 | A * | 3/1996 | Sastri et al. ............... 228/124.1 |
| 5,497,961 | A | 3/1996 | Newton |
| 5,501,575 | A | 3/1996 | Eldredge et al. |
| 5,537,814 | A | 7/1996 | Nastuk et al. |
| 5,584,660 | A | 12/1996 | Carter et al. |
| 5,628,621 | A | 5/1997 | Toborg |
| 5,746,391 | A | 5/1998 | Rodgers et al. |
| 5,769,317 | A | 6/1998 | Sokhey et al. |
| 6,004,095 | A | 12/1999 | Waltz et al. |
| 6,095,750 | A | 8/2000 | Ross et al. |
| 6,102,361 | A | 8/2000 | Riikonen |
| 6,158,207 | A | 12/2000 | Polenick et al. |
| 6,223,616 | B1 | 5/2001 | Sheridan |
| 6,244,539 | B1 | 6/2001 | Lifson et al. |
| 6,364,805 | B1 | 4/2002 | Stegherr |
| 6,381,948 | B1 | 5/2002 | Klingels |
| 6,382,915 | B1 | 5/2002 | Aschermann et al. |
| 6,384,494 | B1 | 5/2002 | Avidano et al. |
| 6,430,917 | B1 | 8/2002 | Platts |
| 6,454,535 | B1 | 9/2002 | Goshorn et al. |
| 6,471,474 | B1 | 10/2002 | Mielke et al. |
| RE37,900 | E | 11/2002 | Partington |
| 6,513,334 | B2 | 2/2003 | Varney |
| 6,619,030 | B1 | 9/2003 | Seda et al. |
| 6,729,576 | B2 * | 5/2004 | Kay et al. .................. 244/17.11 |
| 6,851,264 | B2 | 2/2005 | Kirtley et al. |
| 6,883,303 | B1 | 4/2005 | Seda |
| 6,910,854 | B2 | 6/2005 | Joslin |
| 6,966,174 | B2 * | 11/2005 | Paul ........................... 60/226.1 |
| 7,021,042 | B2 | 4/2006 | Law |
| 7,093,666 | B2 * | 8/2006 | Trumper ....................... 169/62 |
| 7,214,157 | B2 | 5/2007 | Flamang et al. |
| 7,526,921 | B2 * | 5/2009 | Williams et al. .............. 60/796 |
| 7,966,828 | B2 * | 6/2011 | Cini et al. ...................... 60/771 |
| 2002/0190139 | A1 | 12/2002 | Morrison |
| 2003/0031556 | A1 | 2/2003 | Mulcaire et al. |
| 2003/0131602 | A1 | 7/2003 | Ingistov |
| 2003/0131607 | A1 | 7/2003 | Daggett |
| 2003/0192304 | A1 | 10/2003 | Paul |
| 2004/0025490 | A1 | 2/2004 | Paul |
| 2004/0070211 | A1 | 4/2004 | Franchet et al. |
| 2004/0189108 | A1 | 9/2004 | Dooley |
| 2004/0219024 | A1 | 11/2004 | Soupizon et al. |
| 2005/0008476 | A1 | 1/2005 | Eleftheriou |
| 2005/0127905 | A1 | 6/2005 | Proctor et al. |
| 2006/0207826 | A1 * | 9/2006 | Williams ....................... 181/214 |

FOREIGN PATENT DOCUMENTS

| | | |
|---|---|---|
| GB | 905136 | 9/1962 |
| GB | 1287223 | 8/1972 |
| GB | 1503394 | 3/1978 |
| GB | 2026102 | 1/1980 |
| JP | 10184305 | 7/1998 |
| WO | 02081883 | 10/2002 |
| WO | 2004011788 | 2/2004 |
| WO | 2004092567 | 10/2004 |
| WO | 2006059978 | 6/2006 |
| WO | 2006059988 | 6/2006 |
| WO | 2006059989 | 6/2006 |
| WO | 2006060006 | 6/2006 |
| WO | 2006062497 | 6/2006 |
| WO | 2006059971 | 8/2006 |
| WO | 2006059979 | 6/2007 |

* cited by examiner

TIP TURBINE ENGINE COMPOSITE TAILCONE

This invention was made with government support under Contract No.: F33657-03-C-2044. The government therefore has certain rights in this invention.

BACKGROUND OF THE INVENTION

The present invention relates to a tip turbine engine, and more particularly to a non-metallic composite tailcone for the tip turbine engine.

An aircraft gas turbine engine of the conventional turbofan type generally includes a forward bypass fan and a low pressure compressor, a middle core engine, and an aft low pressure turbine all located along a common longitudinal axis. Air flows into the engine at an inner diameter and an outer diameter of the engine. Air entering through the outer diameter of the engine exits the rear of the engine at the outer diameter as a relatively low temperature gas stream after flowing through the bypass fan.

Airflow entering the inner diameter of the engine enters a high pressure compressor driven by a high pressure turbine to compress the air to a high pressure. This high pressure air is then mixed with fuel in a combustor and ignited to form a relatively high temperature gas stream. The high temperature gas stream flows axially aft to rotatably drive the high pressure turbine which rotatably drives the high pressure compressor through the high pressure shaft. The high temperature gas stream leaving the high pressure turbine is expanded through the low pressure turbine which rotatably drives the bypass fan and low pressure compressor through a low pressure shaft. The high temperature gas stream exits the rear of the engine at the inner diameter from the low pressure turbine and flows over a tailcone. The tailcone is made of titanium or other metal to withstand the elevated temperatures of the high temperature gas stream.

Although highly efficient, conventional turbofan engines operate in an axial flow relationship where airflow essentially travels linearly through the engine. The axial flow relationship results in a relatively complicated elongated engine structure of considerable length relative to the engine diameter. This elongated shape may complicate or prevent packaging of the engine in particular applications.

A recent development in gas turbine engines is the tip turbine engine. Tip turbine engines locate an axial compressor forward of a bypass fan which includes hollow fan blades that receive airflow from the axial compressor therethrough such that the hollow fan blades operate as a centrifugal compressor. Compressed core airflow from the hollow fan blades is mixed with fuel in an annular combustor that is radially outward from the fan blades and near an outside diameter of the tip turbine engine. The airflow and fuel mixture is ignited to form a relatively high temperature gas stream which drives the turbine integrated onto the tips of the hollow bypass fan blades for rotation therewith as disclosed in U.S. Patent Application Publication Nos.: 2003192303; 20030192304; and 20040025490. Unlike conventional engines, the relatively high temperature gas stream exits the rear of the tip turbine engine at the outside diameter, while the relatively low temperature gas stream flowing through the bypass fan exits the rear of the tip turbine engine at the inner diameter and flows over the tailcone.

Accordingly and because of the low temperature gas stream discharged from the inner diameter in a tip turbine engine, it is desirable to provide a lighter, non-metallic tailcone in the tip turbine engine.

SUMMARY OF THE INVENTION

The non-metallic tailcone according to the present invention includes a wall structure disposed about a central axis. The wall structure defines an interior compartment and a forward portion that tapers to an aft portion of the non-metallic tailcone. The wall structure of the non-metallic tailcone is a polymer composite that includes woven Kevlar™ fiber impregnated with bismaleimide.

The tip turbine engine produces a first temperature gas stream from a first output source and a second temperature gas stream from a second output source. The first output source is a combustor and the second output source is a bypass fan. The second temperature gas stream from the bypass fan is a lower temperature than the first temperature gas stream from the combustor. The first temperature gas stream is discharged from the combustor at an outer diameter of the tip turbine engine. The second temperature gas stream is discharged from the bypass fan at an inner diameter of the tip turbine engine and flows over the tailcone mounted to a structural frame of the engine. Discharging the warmer first temperature gas stream at the outer diameter and the cooler second temperature gas stream at the inner diameter allows a non-metallic to be used to form the tailcone.

The present invention therefore takes advantage of the cooler temperature gas stream discharged from the inner diameter in a tip turbine engine by providing a light weight non-metallic tailcone in the tip turbine engine.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
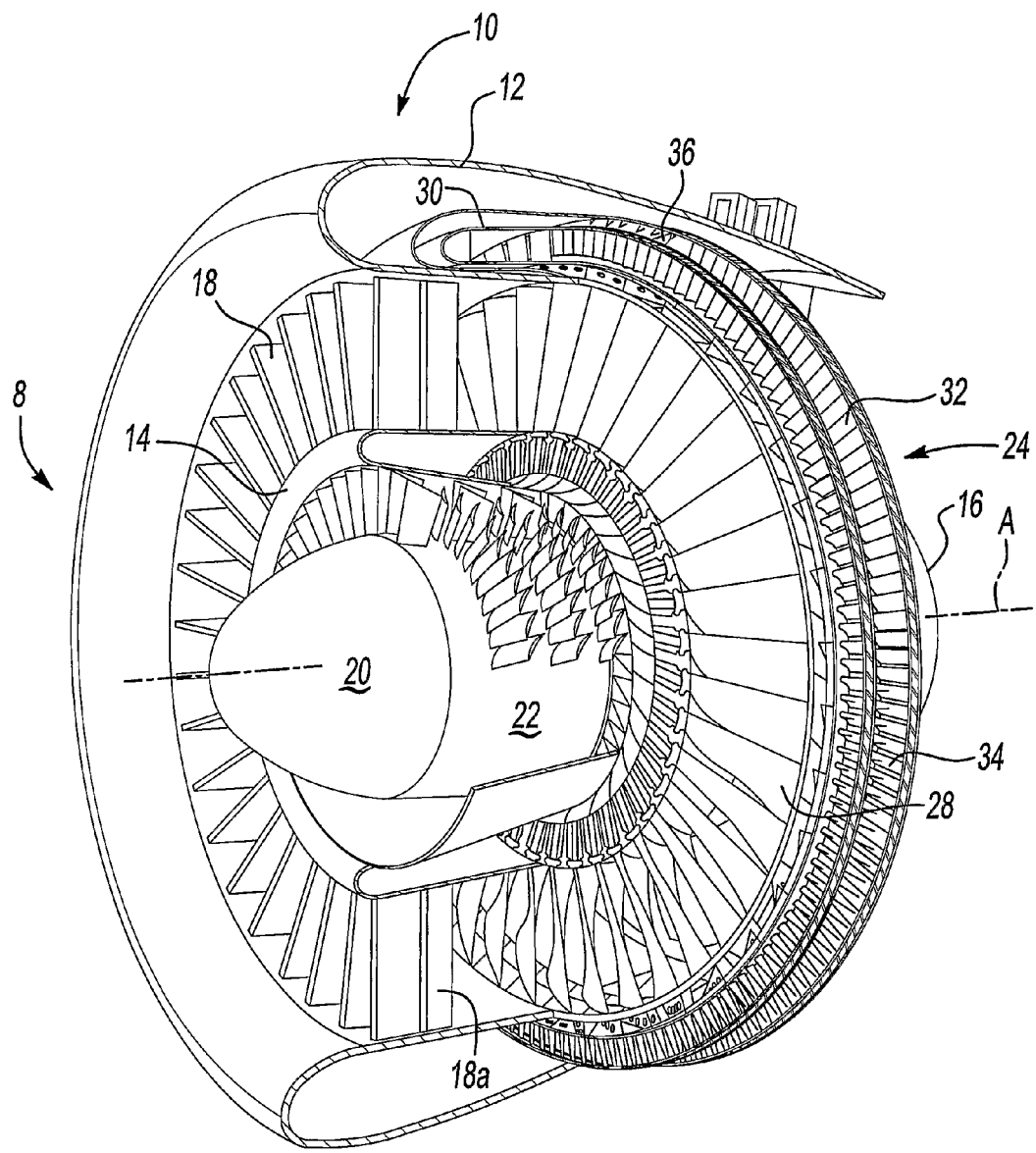
FIG. 1 is a partial sectional perspective view of an exemplary tip turbine engine incorporating a non-metallic tailcone according to the present invention.

FIG. 1 illustrates a partial sectional perspective view of a tip turbine engine (TTE) type gas turbine engine 8. The engine 8 includes an outer case 10, a nonrotatable static outer support structure 12, a nonrotatable static inner support structure 14, and a non-metallic tailcone 16. A plurality of fan inlet guide vanes 18 are mounted between the static outer support structure 12 and the static inner support structure 14. Each inlet guide vane preferably includes a variable trailing edge 18A.

A nosecone 20 is preferably located along the engine centerline A to improve airflow into an axial compressor 22. The axial compressor 22 is mounted about the engine centerline A behind the nosecone 20.

A fan-turbine rotor assembly 24 is mounted for rotation about the engine centerline A aft of the axial compressor 22. The fan-turbine rotor assembly 24 includes a plurality of hollow fan blades 28 to provide internal, centrifugal compression of the compressed airflow from the axial compressor 22 for distribution to an annular combustor 30 located within the nonrotatable static outer support structure 12.

A turbine 32 includes a plurality of tip turbine blades 34 (two stages shown) which rotatably drive the hollow fan blades 28 relative to a plurality of tip turbine stators 36 which extend radially inwardly from the nonrotatable static outer support structure 12. The annular combustor 30 is axially forward of the turbine 32 and communicates with the turbine 32.

Figure 2:
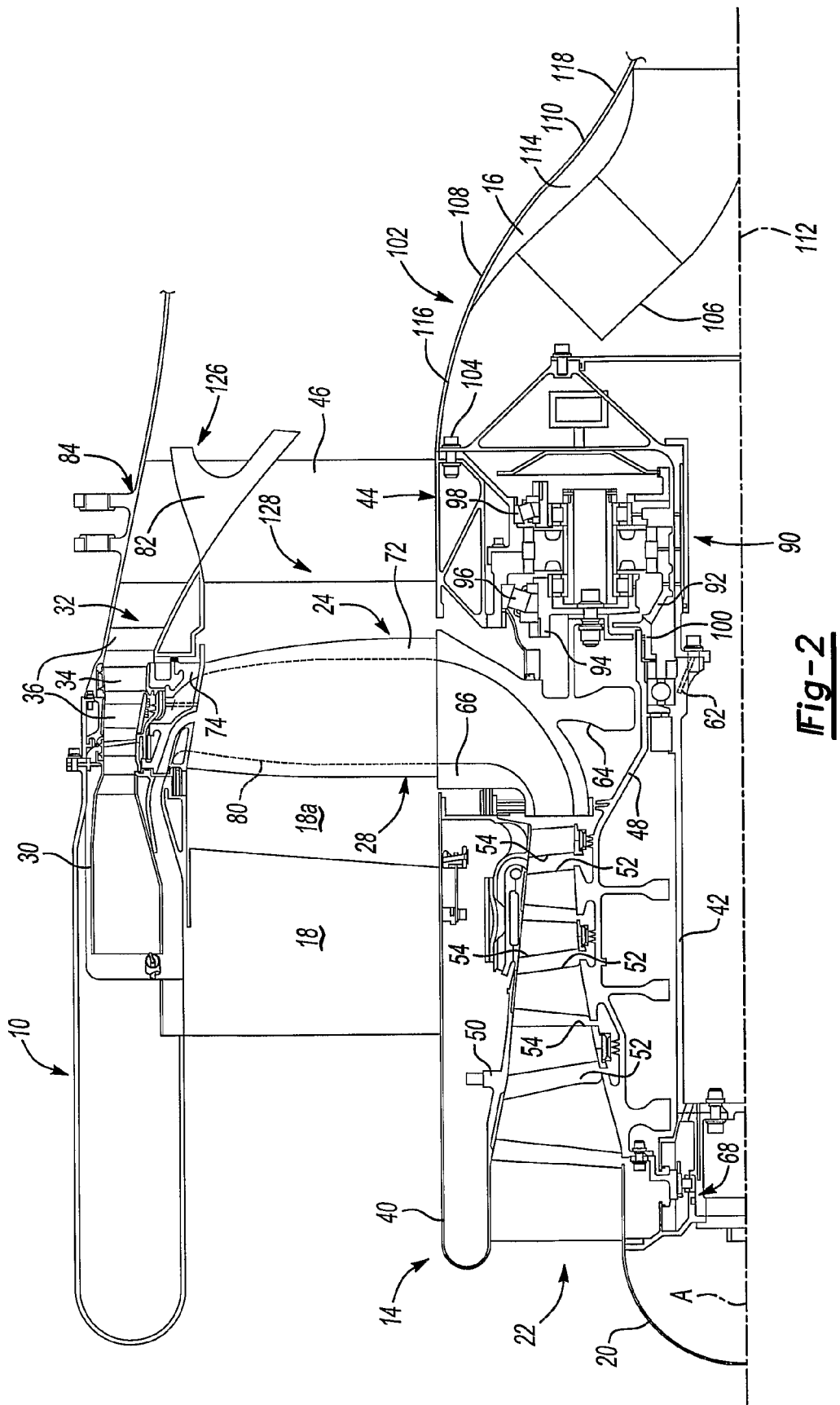
FIG. 2 is a cross-sectional view of the tip turbine engine of FIG. 1.

Referring to FIG. 2, the nonrotatable static inner support structure 14 includes a splitter 40, a static inner support housing 42 and a static outer support housing 44 located coaxial to said engine centerline A. The static outer support housing 44 includes exit guide vanes 46 that extend radially outward to the outer case 10.

The axial compressor 22 includes the axial compressor rotor 48 from which a plurality of compressor blades 52 extend radially outwardly and a compressor case 50 fixedly mounted to the splitter 40. A plurality of compressor vanes 54 extend radially inwardly from the compressor case 50 between stages of the compressor blades 52. The compressor blades 52 and compressor vanes 54 are arranged circumferentially about the axial compressor rotor 48 in stages (three stages of compressor blades 52 and compressor vanes 54 are shown in this example). The axial compressor rotor 48 is mounted for rotation upon the static inner support housing 42 through a forward bearing assembly 68 and an aft bearing assembly 62.

The fan-turbine rotor assembly 24 includes a fan hub 64 that supports a plurality of the hollow fan blades 28. Each hollow fan blade 28 includes an inducer section 66, a hollow fan blade section 72 and a diffuser section 74. The inducer section 66 receives airflow from the axial compressor 22 generally parallel to the engine centerline A and turns the airflow from an axial airflow direction toward a radial airflow direction. The airflow is radially communicated through a core airflow passage 80 within the fan blade section 72 where the airflow is centrifugally compressed.

From the core airflow passage 80, the airflow is turned and diffused toward an axial airflow direction toward the annular combustor 30. Preferably the airflow is diffused axially forward in the engine 8, however, the airflow may alternatively be communicated in another direction. An exhaust mixer 82 extends from an exhaust case portion 84 of the outer case 10 and guides airflow exiting the annular combustor 30 over the tip turbine blades 34 and tip turbine stators 36.

A gearbox assembly 90 aft of the fan-turbine rotor assembly 24 provides a speed increase between the fan-turbine rotor assembly 24 and the axial compressor 22. The gearbox assembly 90 is mounted for rotation between the static inner support housing 42 and the static outer support housing 44. The gearbox assembly 90 includes a sun gear shaft 92 which rotates with the axial compressor 22 and a planet carrier 94 which rotates with the fan-turbine rotor assembly 24 to provide a speed differential therebetween. The gearbox assembly 90 is preferably a planetary gearbox that provides co-rotating or counter-rotating rotational engagement between the fan-turbine rotor assembly 24 and an axial compressor rotor 48. The gearbox assembly 90 is mounted for rotation between the sun gear shaft 92 and the static outer support housing 44 through a forward bearings 96 and a rear bearing 98. The forward bearings 96 and the rear bearing 98 are both tapered roller bearings and both handle radial loads.

The forward bearing 96 handles the aft axial load, while the rear bearing 98 handles the forward axial loads.

The sun gear shaft 92 is rotationally engaged with the axial compressor rotor 48 at a splined interconnection 100 or the like. Alternatively, the gearbox assembly 90 could provide a speed decrease between the fan-turbine rotor assembly 24 and the axial compressor rotor 48.

The non-metallic tailcone 16 is part of a tailcone assembly 102 that attaches to the static outer support housing 44 with a set of fasteners 104, although only one fastener is illustrated in the FIG. 2. The tailcone assembly 102 houses a device 106, such as an oil cooler or other device, and includes a frustoconical surface 108. A wall structure 110 disposed about central axis 112 forms the frustoconical surface 108. The wall structure 110 defines an interior compartment 114 and a forward portion 116 that tapers to an aft portion 118 of the tailcone assembly 102.

A polymer forms the wall structure 110. Preferably the polymer is a polymer composite and includes woven Kevlar™ fiber impregnated with bismaleimide. Other polymer composites such those utilizing epoxy, other polymers, carbon fibers, glass fibers, and other reinforcing substances may also be utilized. Use of a non-metal may provide the benefit of a lighter overall engine weight compared to conventional titanium or other metal tailcones, as the density of non-metals is generally lower than the density of metal. Alternatively, a ceramic matrix composite may be utilized, including ceramic matrix composites with metallic reinforcing substances. The disclosure includes a wall structure including only polymer composites or only ceramic matrix composites.

In operation, air enters the engine 8 at the axial compressor 22, where it is compressed by the three stages of the compressor blades 52 and compressor vanes 54. The compressed air from the axial compressor 22 enters the inducer section 66 in a direction generally parallel to the engine centerline A and is turned by the inducer section 66 radially outwardly through the core airflow passage 80 of the hollow fan blades 28. The airflow is further compressed centrifugally in the hollow fan blades 28 by rotation of the hollow fan blades 28.

From the core airflow passage 80, the airflow is turned and diffused axially forward in the engine 8 into a first output, an annular combustor 30. The compressed core airflow from the hollow fan blades 28 is mixed with fuel in the annular combustor 30 and ignited to form a first temperature gas stream. The first temperature gas stream is expanded over the plurality of tip turbine blades 34 mounted about the outer periphery of the fan-turbine rotor assembly 24 to drive the fan-turbine rotor assembly 24, which in turn drives the axial compressor 22 through the gearbox assembly 90. The first temperature gas stream then exits the tip turbine blades 34 and is guided by the exhaust mixer 82.

Concurrent therewith, a second output, the fan-turbine rotor assembly 24, discharges a second temperature gas stream at an inner engine diameter 128 to merge with the first temperature gas stream from the turbine 32. The combined airflow exits the engine 8 over the frustoconical surface 108 of the non-metallic tailcone 16 to provide forward thrust. The cooler second temperature gas stream from the hollow fan blades 28 discharging at the inner engine diameter 128 over the tailcone assembly 102 allows the non-metallic tailcone 16 to be formed from polymer rather than more temperature resistant titanium or metal material as in conventional engines.

Figure 3:
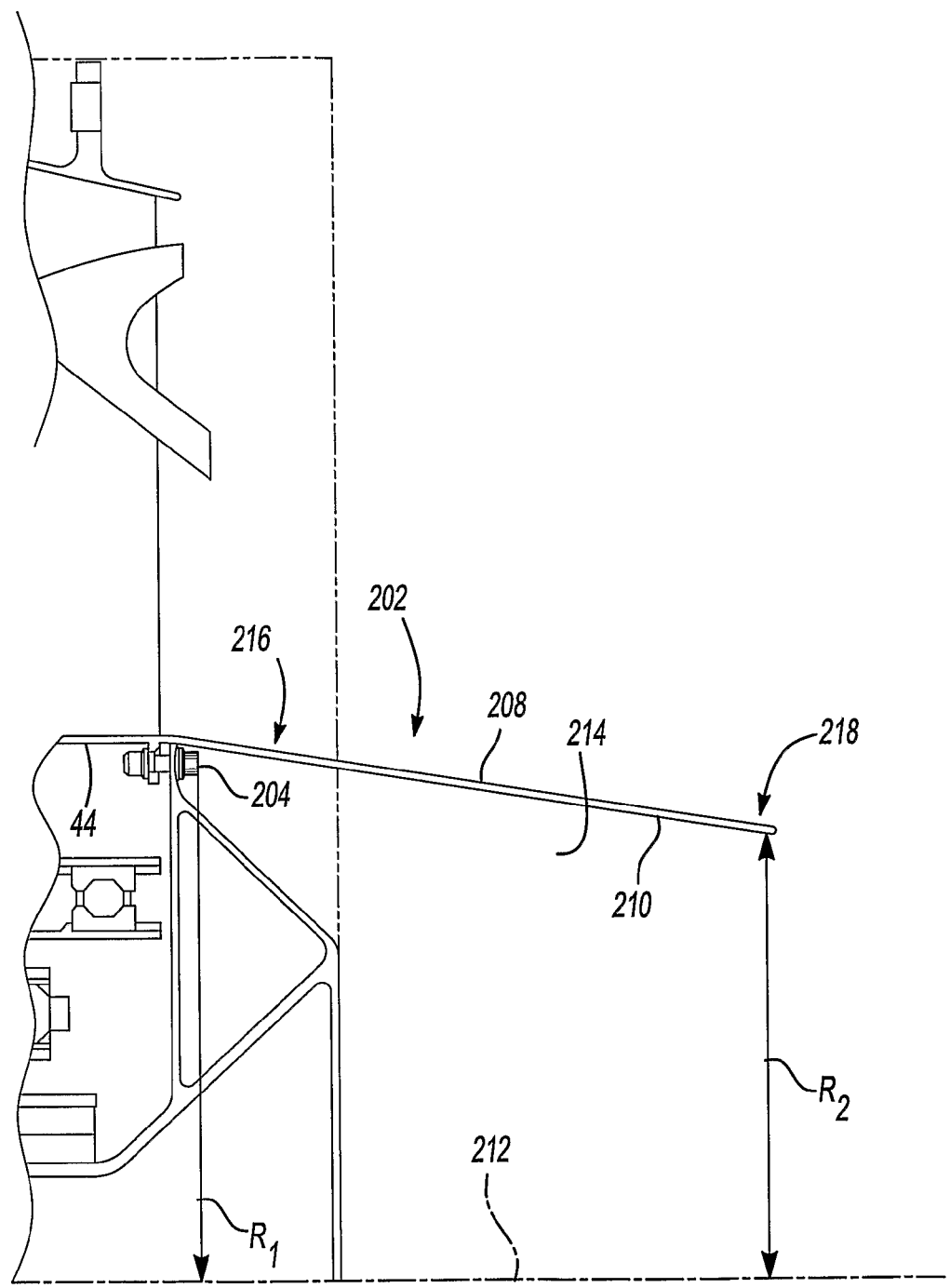
FIG. 3 is a cross-sectional view of a second embodiment of a non-metallic tailcone according to the present invention.

FIG. 3 shows a partial cross-sectional view of a second embodiment of a non-metallic tailcone according to the present invention. The non-metallic tailcone 202 is attached to the static outer support housing 44 with a set of fasteners 204, although only one fastener is illustrated in the FIG. 3. The non-metallic tailcone 202 includes a frustoconical surface 208 and a wall structure 210 disposed about a central axis 212. The wall structure 210 defines an interior compartment 214 and a forward portion 216 with a first radius $R_1$ that tapers to an aft portion 218 with a radius $R_2$ which is less than the diameter $R_1$. Preferably, the non-metallic tailcone 202 includes woven Kevlar™ fiber impregnated with bismaleimide. Other composites such as those utilizing epoxy, other polymers, carbon fibers, glass fibers, other reinforcing substances, and ceramic matrix composites may also be utilized. Use of a non-metallic composite may provide the benefit of a lighter overall engine weight compared to conventional titanium or other metal tailcones, as the density of non-metals is generally lower than the density of metal.

It should be understood that relative positional terms such as "forward," "aft," "upper," "lower," "above," "below," and the like are with reference to the normal operational attitude of the vehicle and should not be considered otherwise limiting.

It should be understood that although a particular component arrangement is disclosed in the illustrated embodiment, other arrangements will benefit from the instant invention.

Although a preferred embodiment of this invention has been disclosed, a worker of ordinary skill in this art would recognize that certain modifications would come within the scope of this invention. For that reason, the following claims should be studied to determine the true scope and content of this invention.

The invention claimed is:

1. A tailcone for a tip turbine engine comprising:
a non-metallic wall structure consisting of a fiber reinforced polymer composite material disposed about a central axis, said non-metallic wall structure defining a forward portion and an aft portion, said tailcone tapering from said forward portion to said aft portion and defining an interior compartment along said central axis.

2. A tailcone as recited in claim 1, wherein said fiber reinforced polymer composite material comprises woven fiber reinforcement.

3. A tailcone as recited in claim 1, wherein said fiber reinforced polymer composite material comprises aramid synthetic fiber reinforcement.

4. A tailcone as recited in claim 1, wherein said fiber reinforced polymer composite material comprises glass fiber reinforcement.

5. A tailcone as recited in claim 1, wherein said fiber reinforced polymer composite material comprises carbon fiber reinforcement.

6. A tailcone as recited in claim 1, wherein said fiber reinforced polymer material composite comprises epoxy.

7. A tailcone as recited in claim 1, further comprising an oil cooler device mounted at least partially within said interior compartment.

8. A tailcone as recited in claim 1, wherein said tailcone is downstream of a first output and a second output of said tip turbine engine, wherein the first output provides a first temperature gas stream and the second output provides a second temperature gas stream, said second temperature being less than said first temperature.

9. A tailcone as recited in claim 1, wherein said tip turbine engine includes a plurality of hollow fan blades each having a radially extending core air flow passage to compress air flow.

10. A tailcone as recited in claim 9, wherein the tailcone is arranged axially aft of the plurality of hollow fan blades to receive a first gas stream having a first temperature from the plurality of hollow fan blades and a second gas stream having a second temperature from a combustor, wherein the first temperature is lower than the second temperature.

11. A tailcone as recited in claim 10, wherein the first gas stream is radially inward of the second gas stream relative to the central axis.

12. A tailcone as recited in claim 1, wherein the tailcone is axially aft of the combustor.

13. A tailcone as recited in claim 1, wherein the nonmetallic wall structure is attached to a static outer support housing.

14. A tailcone as recited in claim 1, wherein the nonmetallic wall structure forms a frustoconical surface.

\* \* \* \* \*

UNITED STATES PATENT AND TRADEMARK OFFICE
CERTIFICATE OF CORRECTION

PATENT NO.        : 9,845,727 B2
APPLICATION NO.   : 11/720463
DATED             : December 19, 2017
INVENTOR(S)       : Gabriel L. Suciu, James W. Norris and Brian Merry It is certified that error appears in the above-identified patent and that said Letters Patent is hereby corrected as shown below:

In the Claims

In Claim 12, Column 6, Line 38; replace "of the combustor" with --of a combustor--

Signed and Sealed this
Fifteenth Day of February, 2022

Drew Hirshfeld
*Performing the Functions and Duties of the*
*Under Secretary of Commerce for Intellectual Property and*
*Director of the United States Patent and Trademark Office*